United States Patent
Ginsberg et al.

(10) Patent No.: US 8,391,157 B2
(45) Date of Patent: Mar. 5, 2013

(54) DISTRIBUTED FLOW ANALYSIS

(75) Inventors: Errol Ginsberg, Malibu, CA (US); Kunjan Naik, Malibu, CA (US); David Lazar, Malibu, CA (US); Sanjay Cartic, Malibu, CA (US); Yian Sun, Malibu, CA (US); John Dalmau, Malibu, CA (US); Aloysius A. Wild, III, Malibu, CA (US); Douglas Schafer, Malibu, CA (US)

(73) Assignee: Ixia, Calabasas, CA (US)

( * ) Notice: Subject to any disclaimer, the term of this patent is extended or adjusted under 35 U.S.C. 154(b) by 419 days.

(21) Appl. No.: 12/140,103

(22) Filed: Jun. 16, 2008

(65) Prior Publication Data

US 2009/0310491 A1 Dec. 17, 2009

(51) Int. Cl.
*H04L 12/26* (2006.01)

(52) U.S. Cl. ........................................ 370/241; 709/224

(58) Field of Classification Search ........... 370/252; 709/235
See application file for complete search history.

(56) References Cited

U.S. PATENT DOCUMENTS

| | | | |
|---|---|---|---|
| 5,787,253 A | 7/1998 | McCreery et al. | |
| 6,041,053 A * | 3/2000 | Douceur et al. | 370/389 |
| 6,717,917 B1 | 4/2004 | Weissberger et al. | |
| 2004/0236866 A1 | 11/2004 | Dugatkin et al. | |
| 2005/0044422 A1 * | 2/2005 | Cantrell et al. | 713/201 |
| 2007/0115833 A1 | 5/2007 | Pepper | |
| 2007/0291654 A1 | 12/2007 | Pepper | |
| 2008/0112332 A1 | 5/2008 | Pepper | |

* cited by examiner

*Primary Examiner* — Albert T Chou
(74) *Attorney, Agent, or Firm* — SoCal IP Law Group LLP; Steven C. Sereboff; John E. Gunther

(57) ABSTRACT

There are disclosed apparatus, methods, and a storage medium for testing a network. A plurality of flows may be received and performance statistics for the flows may be measured and stored. At least a portion of the performance statistics may be analyzed in near real-time using a hierarchical array of processors.

24 Claims, 3 Drawing Sheets

DISTRIBUTED FLOW ANALYSIS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field of the Invention

This disclosure relates to network communications, packets, data units, and the transmission of and receipt of network traffic.

2. Description of the Related Art

Networks such as the Internet carry a variety of data communicated using a variety of network devices including servers, routers, hubs, switches, and other devices. Before placing a network into use, the network and the network devices, network media, network segments and network applications included therein, may be tested to ensure successful operation. Network media, segments, devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network segments, network applications and network devices, networks may be augmented with network analyzing devices, network conformance systems, network monitoring devices, and network traffic generators, all of which are referred to herein as network testing systems. The network testing systems may allow for analyzing the performance of networks, network applications and network devices by capturing, modifying, analyzing and/or sending network communications.

Network testing systems may send and receive a large amount of network traffic and may establish and end many communication sessions. Network interface devices, units, cards, chips and the like within a network testing system may perform much of the work in sending and receiving network traffic and establishing and ending sessions. To track network communications sent and received by network testing systems so that network devices may be tested, network communications are prepared with test information. The functioning of a device under test may be evaluated based on review of the test information included in network communications.

A thorough test of a complex network or a network device may involve the transmission, reception, and evaluation of literally millions of packets of network traffic. Since test data may be measured on each received packet, the sheer volume of test data may preclude real-time or near-real-time analysis of the results of the test. Conventional test systems may transfer all of the test statistics to a common processor for analysis. However, the rate at which test statistics are accumulated may be much faster than the rate at which the test statistics can be communicated to the analysis processor. In this case, the analysis processor may not receive all of the test statistics until the testing has been completed. Thus the test results may be determined only after the fact by post analysis of the test data.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. In cases where a plurality of elements perform the same general function, the elements may be given a common reference designator number with a letter suffice.

DETAILED DESCRIPTION

Throughout this description, the embodiments and examples shown should be considered as exemplars, rather than limitations on the apparatus and methods disclosed or claimed.

Description of Apparatus

Figure 1:
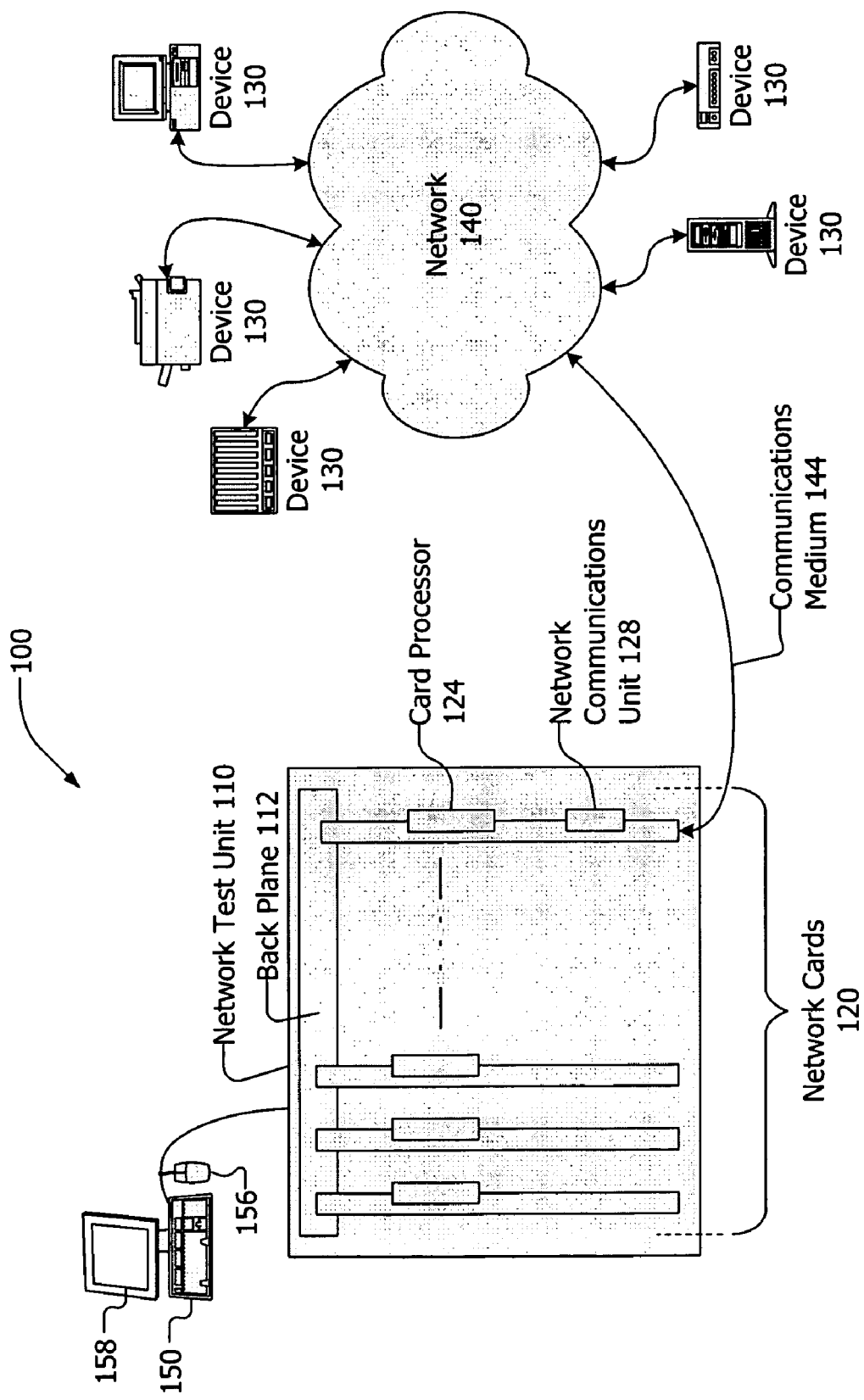
FIG. 1 is a diagram of an environment in which distributed flow analysis may be implemented.

Referring now to FIG. 1, there is shown a block diagram of a network test system 100. The network test system 100 includes at least one network test unit 110 coupled via at least one network card 120 to a network 140 over a communications medium 144. The network test unit 110 may include or be one or more of a performance analyzer, a conformance validation system, a network analyzer, a data unit blaster, a network management system, a combination of these, and/or others. The network test unit 110 may be used to evaluate and/or measure characteristics and performance of a communication line or system, including the throughput of network traffic, the number of dropped data units, jitter, and many others. The network test unit 110 may be used to evaluate the performance of servers, networking devices such as, for example, routers, gateways, load sharers, and others, as well as network application programs and other software.

The network test unit 110 may be in the form of a chassis or card rack, as shown in FIG. 1, or may be an integrated unit. The network test system 100 may comprise a number of separate network test units, such as two or more chassis, cooperating to provide network analysis, network conformance testing, and other tasks.

The network test unit 110 may include one or more network cards 120 and a backplane 112. The network cards 120 may be coupled to the backplane 112. The network cards 120 may be permanently installed in the network testing system 110, may be removable, or may be a combination thereof.

Network card 120 may be coupled with network 140 via a communications medium 144. Although only one connection over the communications medium 144 is shown, each of the network cards 120 may be connected with network 140 over the communications medium 144. Each of the network cards 120 may have multiple connections with the network 140. The communications medium 144 may be, for example, wire lines such as an Ethernet cable or coaxial cable, fiber optic cable, or a wireless interconnection.

The network test unit 110 and the network cards 120 may support one or more well known higher level communications standards or protocols including the Hypertext Transfer Protocol (HTTP); may support one or more well known lower level communications standards or protocols such as, for example, the 10 and/or 100 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®) and Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The backplane 112 may serve as a bus or communications medium for the network cards 120. The backplane 112 may also provide power to the network cards 120. The backplane 112 may include a unit processor, not shown in FIG. 1.

The network test system 100 may include one or more client computer 150 coupled to at least one network test unit 110. The client computer 150 may be local to, or remote from, the network test unit 110. The client computer 150 may have coupled therewith a display 158 and user input devices such as a keyboard (not shown) and a mouse 156, as well as other user input devices including, for example, pens and trackballs.

The client computer 150, the network testing unit 110, and/or one or more of the network cards 120 may include an operating system such as, for example, versions of MS DOS, Microsoft Windows, Mac OS, Palm OS, Symbian OS, Unix or Linux.

The network testing unit 110 may be implemented in a computer such as a personal computer, server, or workstation, as well as the chassis shown. The network testing unit 110 may be used alone or in conjunction with one or more other network testing units 110. The network testing unit 110 may be located physically adjacent to and/or remote to the devices 130 in the network 140. The network testing unit 110 may be used to test and evaluate the network 140 and/or portions thereof, network capable devices 130, application programs running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or may be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including packets, frames, cells, datagrams, data units, higher level logical groupings of data, or other units of information, all of which are referred to herein as packets. Those packets that are communicated over a network are referred to herein as network traffic. The network traffic may include packets that represent electronic mail messages, computer files, web pages, graphics, documents, audio and video files, streaming media such as music, video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

To communicate data units on the network 140, the network test system 100, including the client computer 150, the network test unit 110, and the plurality of network cards 120 may run various types of application programs, such as test applications. Test applications have functions such as performance analysis, conformance validation, network analysis, packet blasting, and network management.

A test application may cause the network test system 100 to generate or receive a large number of packets from the network or devices under test. The test application may cause the network test system 100 to measure, compile and store performance statistics on the network or device under test, which will be referred to as the system under test (SUT). These performance statistics may include volume of traffic measures such as the total number of packets or bytes transmitted or received; quality measures such as the number of checksum errors, number of lost packets, number of reordered packets, and bit error rates; and temporal measures such as the minimum, maximum, or average latency or response time of the SUT.

The test application may perform multiple tests on the same network or device, or on multiple networks or devices, concurrently. It may be desired to measure and compile performance statistics on different test parameters, conditions, networks, or devices concurrently. To allow the compilation of multiple sets of performance statistics, received packets may be organized into flows or packet groups, where a flow is defined as a plurality of packets to be measured by a common set of performance statistics. The packets comprising a flow may be identified by some common characteristic. For example, a flow may be a plurality of packets sent to, through, or from a specific device or address on the network under test. A flow may alternatively be referred to as a packet group or session. The packets comprising a flow may be given consecutive sequence numbers to allow detection of missing and out-of-order packets.

In order to maintain performance statistics on multiple flows concurrently, the test system must be able to segregate received packets into the appropriate flows. One method for segregating packets is to assign a packet group identification (PGID) number to each flow, and then embed the appropriate packet group identification number within each packet. The PGID may be contained in a specific field inserted in a packet solely to identify a packet as a member of a specific flow for test purposes. The PGID may be contained in a plurality of non-contiguous fields that are concatenated or otherwise combined to form the PGID. A PGID field may also serve an additional purpose within the packet. For example, a PGID field may comprise all or a portion of a header field, an IP address field, a VLAN (Virtual Local Area Network) Tag, a MPLS (Multiprotocol Label Switching) label, or some other field. Since multiple fields within a packet may be used as a PGID field, a single packet may belong to a plurality of flows. Techniques other than a PGID field may be used to segregate received packets into flows.

Figure 2:
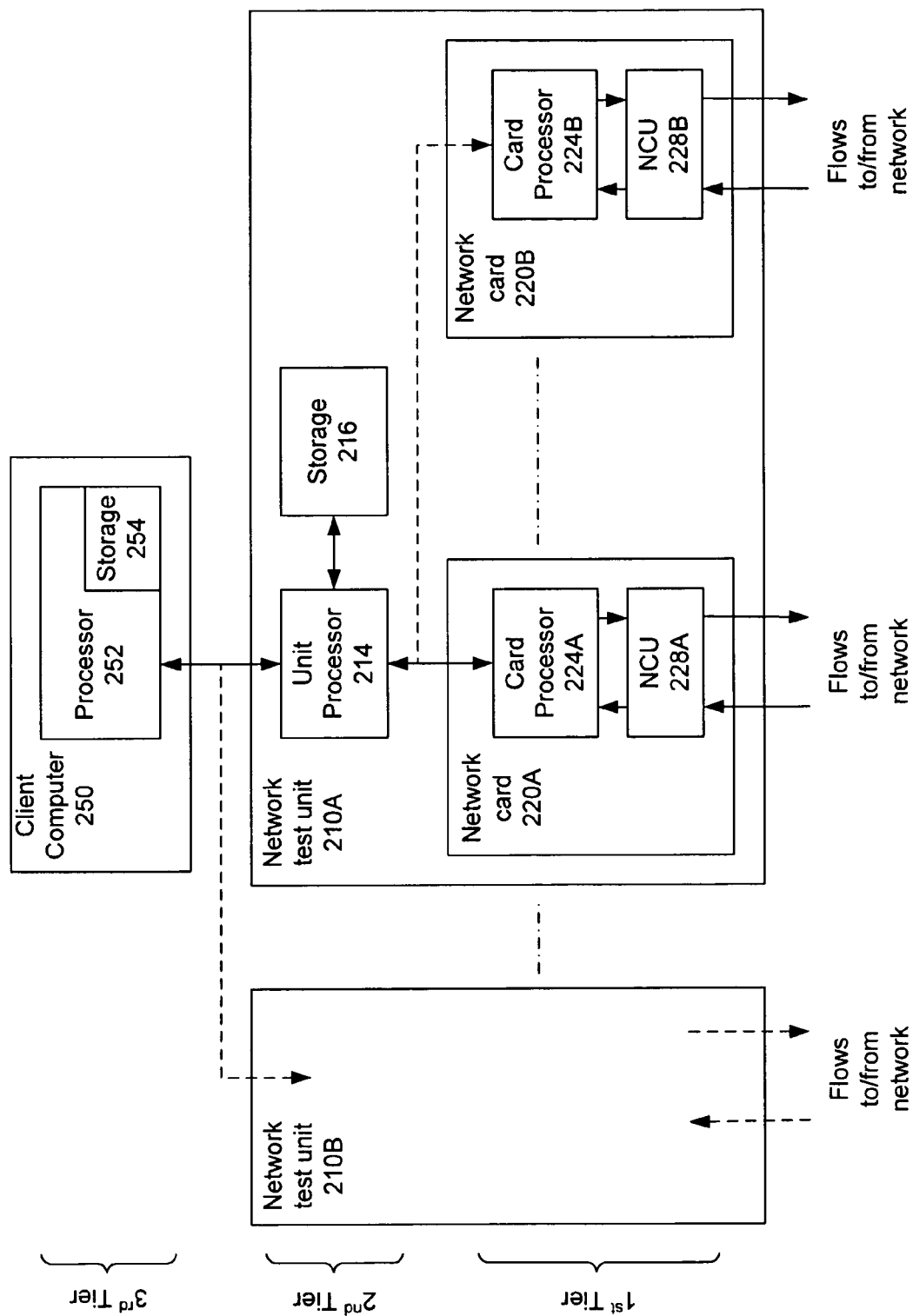
FIG. 2 is a block diagram of a network test system.

FIG. 2 is a block diagram of an exemplary hierarchical processor array 200 for analyzing flow statistics. At least one client computer 250 including a processor 252 may be in communication with one or more network test units 210A/210B, each of which may contain one or more unit processor 214A/B. Each unit processor 214A/B may be in communication with a plurality of network cards 220A/B, each of which may contain at least one card processor 224A/B. Each card processor 224A/B may be coupled to an associated network communication unit (NCU) 228A/B. The client computer 250, the unit processors 214A/B, and the card processors 224A/B constitute the processor array 200. The processor array 200 may have three tiers, with the card processors on the lowest tier, the unit processors on the middle tier, and the client computer on the upper tier.

FIG. 2A shows the exemplary hierarchical processor array 200 as having two network test units 210A/210B, each of which includes two network cards. A hierarchical process or array may include one, two, or more test units, and each test unit may have two or more network cards.

The exemplary hierarchical processor array 200 is hierarchical in that each processor communicates only with a dedicated group of subordinate processors on the next lower tier and with a single superior processor at the next higher tier. The processor array 200 may be hierarchical only with respect to analyzing flow statistics, and the various processors may communicate along different paths and in different ways when performing other tasks.

Each client computer 250 may include or be coupled to a storage device 254. Each unit processor 214 may be coupled to another storage device 216 included within or coupled to each network test unit 210A/B. As used herein, a storage device is a device that allows for reading and/or writing to a storage medium. Storage devices include hard disk drives, CD drives, DVD drives, flash memory devices, and others.

The client computer may run one or more application programs defined by instructions stored on a computer-readable storage media in the storage device 254. These storage media include, for example, magnetic media such as hard disks, floppy disks and tape; optical media such as compact disks (CD-ROM and CD-RW) and digital versatile disks (DVD and DVD-RW); flash memory cards; and other storage media.

The unit processors 214A/B and the plurality of card processors 224A/B may run application programs that may also be defined by instructions stored on either a computer-readable storage media in the storage device 216 or a computer-readable media in the storage device 254. Instructions stored in the storage device 254 or the storage device 216 may be downloaded to the unit processors 214A/B and the card processors 224A/B before or during a network test session. The instructions stored on the computer-readable storage media may include instructions that cause the hierarchical processor array 200 to perform the processes subsequently described herein.

The plurality of NCUs 228A/B may be adapted to generate and receive a large number of packets during a network test. Each packet may belong to one or more flows, and each NCU 228A/B may measure and accumulate flow statistics for each flow. The plurality of NCUs 228A/B may measure and accumulate flow statistics for thousands or millions of flows during a comprehensive test of a complex network or network equipment. Each NCU 228A/B may measure flow statistics using dedicated hardware, firmware, and software or some combination thereof. Each NCU 228A/B may store flow statistics in memory internal or external to the NCU. Each NCU 228A/B may store flow statistics in memory shared with the associated card processor 224A/B. At least a portion of the flow statistics may be communicated from each NCU 228A/B to the associated card processor 224A/B for analysis. The flow statistics may be communicated from the NCUs to the associated card processors periodically, or upon request.

Each card processor 224A/B may analyze at least a portion of the flow statistics accumulated by the associated NCU 228A/B. The specific analysis that may be performed by the card processors 224A/B will be discussed in the subsequent Description of Processes. The results of the analysis performed by the network card processors 224A/B may be collectively considered first-tier results. The first-tier results may be communicated to the unit processor 214A.

Each unit processor 214A/B may analyze at least a portion of the first-tier results provided by the associated network card processors. The specific analysis that may be performed by the unit processors 214A/B will be discussed in the subsequent Description of Processes. The results of the analysis performed by the unit processors 224A/B may be collectively considered second-tier results. The second-tier results may be communicated to the client computer 250. The client computer 250 may perform further analysis on at least a portion of the second-tier results provided by the unit processors 214A/B. The results of the analysis performed by the client computer may be considered third-tier results.

The client computer 250 may be coupled to a display, printer, or other output device (not shown in FIG. 2) with which to present or report the third-tier results and other results of the analysis performed by the hierarchical processor array 200. The client computer 250 may be coupled to a network (not shown in FIG. 2) to transmit the results of the analysis performed by the hierarchical processor array 200 to a remote location. The client computer 250 may format the third-tier results for presentation, transmission, or storage.

Additional and fewer units, modules or other arrangement of software, hardware and data structures may be used to achieve the systems and devices described herein.

Description of Processes

Figure 3:
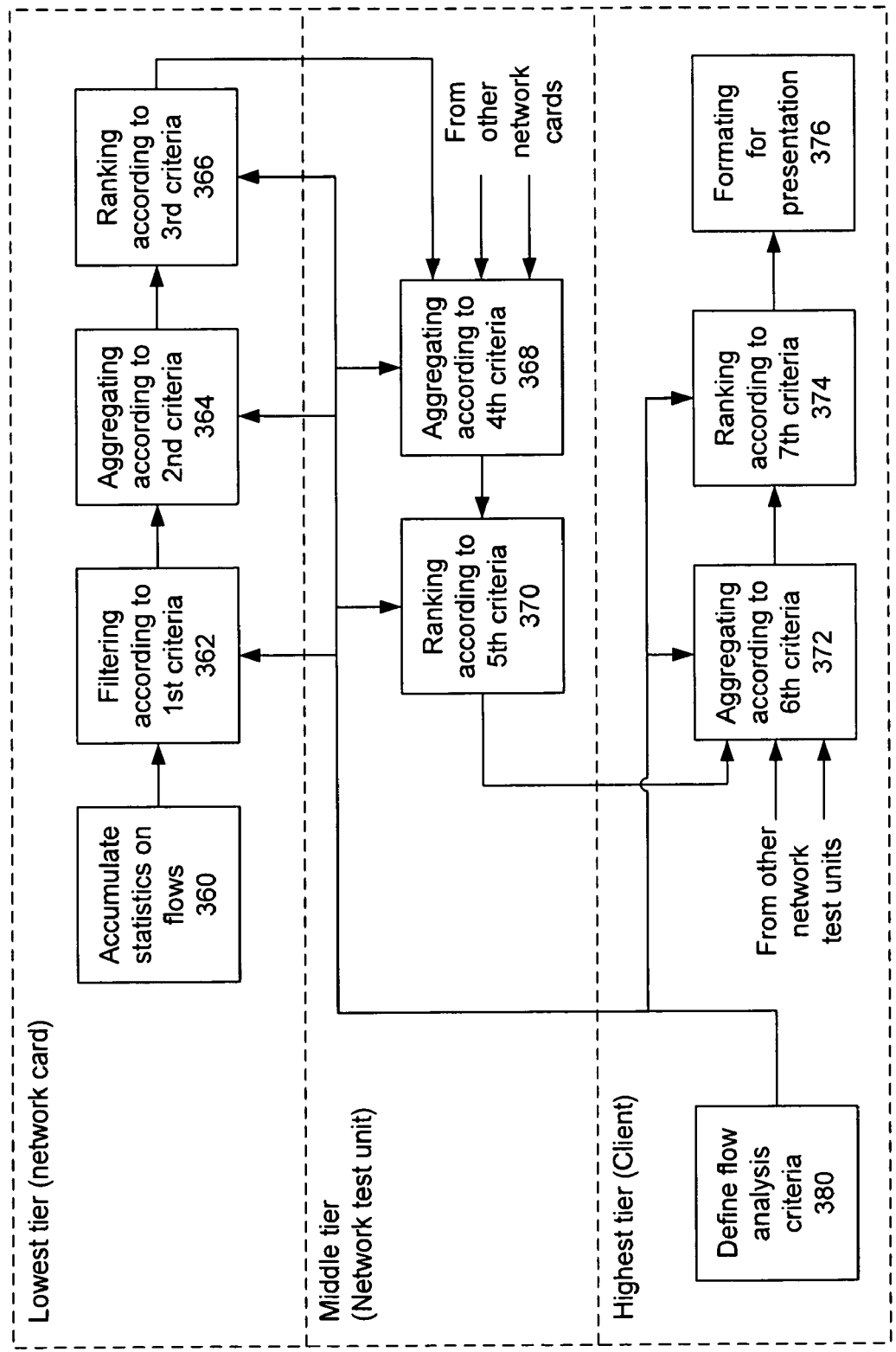
FIG. 3 a flow chart of a process for distributed flow analysis.

Referring now to FIG. 3, a process 300 for analyzing flow statistics may be performed on a hierarchical processor array, which may be the hierarchical processor array 200. Starting at 380, a set of criteria for analyzing the flow statistics may be established. The set of criteria may include all of part of first through seventh criterion that will be described subsequently. The set of criteria may be established at 380 through the interaction of a test operator and a software application running on a client computer. The software application may provide a "wizard" or other user interface to interactively assist the operator in establishing the analysis criteria. The analysis criteria, once established, may be distributed to process elements within the hierarchical processor array.

At the lowest level of the hierarchical processor array, which may be a network card or a portion of a multi-processor network card, flow statistics may be accumulated at 360. At 362, the flows may be filtered according to a first criterion. The filtering may result in selection of only a subset of the total number of flows according to the first criterion. The filtering may also result in selection of only a portion of the flow statistics for each of the selected flows. Within this description, the term "criterion" has the conventional meaning of "a standard on which a decision or judgment may be based" and is intended to include rules, limits, formula, algorithms, masks, combinations thereof, and any other standards on which a decision may be based. The use of the singular "criterion" is intended to encompass situations where a set of criteria is used to make a decision or judgment.

The first criterion may lead to selection of flows based on identity (such as a range of PGIDs), characteristic (such as a data type), performance (flow statistics), or a combination thereof. For example, at 362, flows having PGIDs within a specified range may be selected, or flows that have received at least 1000 packets may be selected, or flows that receive only TCP/IP packets may be selected. The first criterion may lead to selection of flows based on multiple parameters. For further example, application of the first criterion may result in selection of flows that (a) have PGIDs between 1 and 100 and (b) have received at least 1000 TCP/IP packets, and (c) have received at least one packet with a checksum error.

The first criterion may indicate flows to be selected by both a range of PGID numbers and a mask defining which flows to select from within the defined range. The range pf PGID numbers may be defined by a starting PGID number and either a final PGID number or an extent or number of PGIDs within the range. For example, the first criterion could specify a range of 256 PGID numbers starting with number 1024 and further provide a 256-bit mask to select ("1"=selected, "0"=not selected, or vice versa) specific flows from within the range.

The application of the first criterion at 362 may also result in selection of a subset of the available flow statistics that will be reported. For further example, at 362, only the average latency and error rate statistics may be retrieved for the selected flows.

At 364, the flows selected at 362 may be aggregated according to a second criterion. The aggregation may reduce or consolidate the amount of flow statistics data. For example, at 364, flow statistics such as latency time may be averaged across multiple flows previously selected at 362. The second criterion may define one or more operations to be performed on the flow statistics. The second criterion may define different operations to be performed on different flow statistics. For example, aggregating flow statistics from a plurality of selected flows may require calculating a weighted average of the average latencies of the plurality of flows, summing the total number of packets received and the total number of errors, and selecting a single maximum latency value. The operations to be performed may be predetermined for some or all of the flow statistics. Where the operations are predetermined, the second criterion may specify which statistics are to be aggregated but not how the aggregation is performed.

The second criterion may specify how the previously selected flows are grouped for aggregation, such that data from a larger plurality of selected flows is aggregated into a smaller plurality of groups or aggregation buckets. For example, the second criterion may include a mask indicating which bits of the flow PGID numbers should be used to group the selected flows for aggregation. The mask may be the same length as the PGID numbers and may have a value of "1" in bit locations that are used for grouping the flows for aggregation and a value of "0" (or vice versa) in bit locations that are ignored for the purpose of grouping flows for aggregation. For example, a mask "1100 . . . 011" would aggregate flows into sixteen aggregation buckets using the two most-significant and the two least-significant bits of the PGID numbers. A mask of "0 . . . 0" would result in no aggregation of the selected flows, and the flow statistics for the selected flows would simply be reported to 366. Although the flows may be aggregated in a plurality of aggregation buckets not all of the aggregation buckets may be used for further analysis. Continuing the previous example, flows may be aggregated into sixteen aggregation buckets, but only the first six of the buckets may be selected for further analysis.

At 366, selected aggregated flows, or the flows themselves in the case where aggregation is not performed, from 364 may be ranked according to a third criterion. The third criterion may define one or more parameters on which the flows or aggregated flows may be ranked or ordered. The third criterion may also include selection criterion for selecting specific flows or aggregated flows according to their rank. Continuing the example from the previous paragraph, at 366, the 16 aggregation buckets of aggregated flows may be ranked by average latency and the aggregated flow statistics data for the three aggregation buckets having the longest latency and the three aggregation buckets having the shortest latency may be communicated to the next higher tier.

The lowest tier of the hierarchical processor array may perform at least one of filtering according to the first criterion 362, aggregating according to the second criterion 364, and ranking according to the third criterion 366. Filtering, aggregating, and ranking may be performed concurrently, at least in part, or in a different order from that shown in FIG. 3. Other analysis procedures, not shown in FIG. 3, may be performed in addition to filtering, aggregating, and/or ranking. Each of the filtering, aggregating, and ranking is optional and may not be performed. The first-tier results of the filtering, aggregating, and/or ranking performed at the lowest tier of the hierarchical processor array may be communicated to the next higher tier in the hierarchical processor array. The volume of data communicated from the first tier to the next higher tier as the first-tier results may be very small compared to the total test data accumulated by the lowest tier.

In the example of FIG. 3, the next higher tier is the middle tier, which may be a network test unit processor. At 368, the first-tier results may be aggregated according to a fourth criterion. The aggregating at 368 may combine the first-tier results received from a plurality of processors on the lower tier of the hierarchical processor array. The aggregating at 368 may reduce or consolidate the first-tier results.

At 370, the aggregated first-tier results from 368 may be ranked according to a fifth criterion. The fifth criterion may define one or more parameters on which the aggregated first tier results may be ranked or ordered. The parameters defined by the fifth criterion may be the same or may be different from the parameters defined by the third criterion. The fifth criterion may also include selection criterion for selecting specific first-tier results according to their rank.

The middle tier of the hierarchical processor array may perform at least one of aggregating according to a fourth criterion 368, and ranking according to a fifth criterion 370. Aggregating, and ranking may be performed in different order from that shown in FIG. 3. Other analysis procedures, not shown in FIG. 3, may be performed in addition to aggregating and/or ranking. The second-tier results of the aggregating and/or ranking performed by each processor in the middle tier of the hierarchical processor array may be communicated to the next higher tier in the hierarchical processor array. The volume of data communicated from each processor in the middle tier to the next higher tier as the second-tier results may be small compared to the total volume of data that each processor in the middle tier received from its associated lower-tier processors. In the event that a network test unit contains only a single network card, aggregating according to a fourth criterion 368 and ranking according to a fifth criterion 370 may not be performed and the first tier results may be communicated directly to the next higher tier.

In the example of FIG. 3, the next higher tier is the upper tier, which may be a client computer. At 372, the second-tier results may be aggregated according to a sixth criterion. The aggregating at 372 may combine the second-tier results received from a plurality of processors on the middle tier of the hierarchical processor array. The aggregating at 372 may reduce or consolidate the second tier results.

At 374, the aggregated second-tier results from 372 may be ranked according to a seventh criterion. The seventh criterion may define one or more parameters on which the aggregated second-tier results may be ranker or ordered. The parameters defined by the seventh criterion may be the same or may be different from the parameters defined by the third criterion and/or the fifth criterion. The seventh criterion may also include selection criterion for selecting specific aggregated second-tier results according to their rank.

The upper tier of the hierarchical processor array may perform aggregating according to a sixth criterion 372, and ranking according to a seventh criterion 374. Aggregating and ranking may be performed in different order from that shown in FIG. 3. Other analysis procedures, not shown in FIG. 3, may be performed in addition to aggregating and/or ranking. The third-tier results of the aggregating and/or ranking performed at the upper tier of the hierarchical processor array may be formatted for presentation, storage, transmission over a network and/or other use at 376. In the event that a client computer is connected to only a single network test unit, aggregating according to a sixth criterion 372 and ranking according to a seventh criterion 374 may not be performed, and the second tier results may be formatted for use at 376.

The process 300 for analyzing flow statistics may be performed in near real-time, where "in near real-time" has the meaning of concurrently or immediately after the required flow statistics have been measured. For example, an analysis that identifies the five flows having the highest error rates among flows having at least 1000 packets cannot be completed until at least five flows have received 1000 packets and until the test statistics for those flows have been analyzed and communicated from the network cards receiving the flows through the hierarchical processor array to the user who requested the analysis. Since the processing required to perform the analysis is distributed across the hierarchical processor array, the time delay incurred while analyzing and communicating analysis results between the tiers of the processor array may be very small compared to the time delays incurred in a conventional test system, where all of the test statistics may be communicated to a common computer for analysis. The near real-time availability of analysis results may facilitate the identification of problems with the test methods or the network under test and allow modification or adaptation of the tests in progress.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for testing a network, comprising:
   receiving a plurality of packets, each packet including a packet group identification number identifying the packet as a member of one of a plurality of flows;
   measuring and storing flow statistics for each of the plurality of flows; and
   analyzing in near real-time at least a portion of the stored flow statistics using a hierarchical array of processors, wherein analyzing further comprises:
   a lower tier of the hierarchical array of processors filtering the plurality of flows according to a first criterion to select a subset of flows from the plurality of flows, the lower tier of the hierarchical array of processors grouping the flows of the selected plurality of flows into a plurality of aggregation groups according to a second criterion, the lower tier of the hierarchical array of processors aggregating at least some of the stored flow statistics for the each of the plurality of aggregation groups to provide first-tier aggregated flow statistics for each of the plurality of aggregation groups, and at least one higher tier of the hierarchical array of processors further aggregating at least some of the first tier aggregated flow statistics.

2. The method for testing a network of claim 1, wherein the at least one higher tier comprises a client computer, and the lower tier comprises a plurality of network cards, each network card including a card processor.

3. The method for testing a network of claim 1, further comprising:

the lower tier of the hierarchical array of processors ranking the first tier aggregated flow statistics according to a third criterion.

4. The method for testing a network of claim 1, wherein the at least one higher tier includes a middle tier, the method further comprising:

the middle tier of the hierarchical array of processors receiving first-tier aggregated flow statistics from one or more associated processors at the lower tier of the hierarchical array of processors and performing at least one of aggregating the first-tier aggregated flow statistics according to a fourth criterion and ranking the first-tier aggregated flow statistics according to a fifth criterion to provide second-tier results.

5. The method for testing a network of claim 4, wherein the at least one higher tier also includes a upper tier, the method further comprising:

the upper tier of the hierarchical array of processors receiving second-tier results from one or more associated processors at the middle tier of the hierarchical array of processors and performing at least one of aggregating the second-tier results according to a sixth criterion and ranking the second-tier results according to a seventh criterion to provide third-tier results.

6. The method for testing a network of claim 5, further comprising:

the upper tier formatting at least a portion of the third-tier results for presentation.

7. The method for testing a network of claim 1, wherein the first criterion includes a range of packet group identification numbers defining, at least in part, the selected subset of flows.

8. The method for testing a network of claim 1, wherein the second criterion includes a mask indicating which bits of the packet group identification numbers are used to group the selected subset of flows into the plurality of aggregation groups.

9. An apparatus for testing a network, comprising:

a client computer;

one or more network test units in communication with the client computer, the one or more network test units each including a unit processor; and a plurality of network cards disposed in each of the one or more network test units, the network cards including a corresponding plurality of card processors, wherein at least a portion of the flow statistics are analyzed in near real-time by a hierarchical processor array formed by the client computer, the one or more unit processors, and the plurality of card processors;

wherein each card processor is configured:

to receive a plurality of packets, each packet including a packet group identification number identifying the packet as a member of one of a plurality of flows, to measure and store flow statistics for each of the plurality of flows, to filter the plurality of flows according to a first criterion to select a subset of flows from the plurality of flows, to group the selected plurality of flows into a plurality of aggregation groups according to a second criterion, and to aggregate at least some of the stored flow statistics for the each of the plurality of aggregation groups to provide first-tier aggregated flow statistics for each of the plurality of aggregation groups; and wherein at least one of the client computer and the one or more unit processors is configured to further aggregate at least some of the first tier aggregated flow statistics.

10. The apparatus for testing a network of claim 9, wherein each network card includes one or more network communication units to receive packets, to segregate received packets into flows, and to measure and store the flow statistics.

11. The apparatus for testing a network of claim 9, wherein the plurality of card processors are further configured to communicate first-tier results to the one or more unit processors, the first-tier results including one or both of the first-tier aggregated flow statistics and the first-tier aggregated flow statistics ranked according to a third criterion.

12. The apparatus for testing a network of claim 11, wherein the one or more unit processors are configured to perform at least one of aggregating and ranking of the first-tier results to provide second-tier results, and to communicate the second-tier results to the client computer.

13. The apparatus for testing a network of claim 12, wherein the client computer is configured to perform at least one of aggregating and ranking on the second-tier results to provide third-tier results.

14. The apparatus for testing a network of claim 12, wherein the client computer is configured to format the third-tier results for presentation.

15. The apparatus for testing a network of claim 9, wherein the first criterion includes a range of packet group identification numbers defining, at least in part, the selected subset of flows.

16. The apparatus for testing a network of claim 9, wherein the second criterion includes a mask indicating which bits of the packet group identification numbers are used to group the selected subset of flows into the plurality of aggregation groups.

17. A non-transitory storage medium having instructions stored thereon which when executed by a hierarchical array of processors will cause the hierarchical array of processors to perform actions comprising:

receiving a plurality of packets, each packet including a packet group identification number identifying the packet as a member of one of a plurality of flows;

measuring and storing flow statistics for each of the plurality of flows; and analyzing in near real-time at least a portion of the flow statistics using a hierarchical array of processors, wherein analyzing further comprises:

a lower tier of the hierarchical array of processors filtering the plurality of flows according to a first criterion to select a subset of flows from the plurality of flows, the lower tier of the hierarchical array of processors grouping the flows of the selected plurality of flows into a plurality of aggregation groups according to a second criterion, the lower tier of the hierarchical array of processors aggregating at least some of the stored flow statistics for the each of the plurality of aggregation groups to provide first-tier aggregated flow statistics for each of the plurality of aggregation groups, and at least one higher tier of the hierarchical array of processors further aggregating at least some of the first tier aggregated flow statistics.

18. The non-transitory storage medium of claim 17, the actions performed further comprising the lower tier of the hierarchical array of processors ranking the first-tier aggregated flow statistics according to a third criterion.

19. The non-transitory storage medium of claim 18, wherein the at least one higher tier includes a middle tier, the actions performed further comprising:

the middle tier of the hierarchical array of processors receiving first-tier aggregated flow statistics from one or more associated processors at the lower tier of the hierarchical array of processors and performing at least one of aggregating the first-tier aggregated flow statistics according to a fourth criterion and ranking the first-tier aggregated flow statistics according to a fifth criterion to provide second-tier results.

20. The non-transitory storage medium of claim 19, wherein the at least one higher tier further includes an upper tier, the actions performed further comprising:

the upper tier of the hierarchical array of processors receiving second-tier results from one or more associated processors at the middle tier of the hierarchical array of processors and performing at least one of aggregating the second-tier results according to a sixth criterion and ranking the second-tier results according to a seventh criterion to provide third-tier results.

21. The non-transitory storage medium of claim 20, wherein the upper tier comprises a client computer, the middle tier comprises one or more network test units, each network test unit including a unit processor, and the lower tier comprises a plurality of network cards disposed within the network test units, each network card including a card processor.

22. The non-transitory storage medium of claim 21, the actions performed further comprising formatting at least a portion of the third-tier results for presentation.

23. The non-transitory storage medium of claim 17, wherein the first criterion includes a range of packet group identification numbers defining, at least in part, the selected subset of flows.

24. The non-transitory storage medium of claim 17, wherein the second criterion includes a mask indicating which bits of the packet group identification numbers are used to group the selected subset of flows into the plurality of aggregation groups.

\* \* \* \* \*